United States Patent
Corbett et al.

(10) Patent No.: US 10,719,356 B1
(45) Date of Patent: Jul. 21, 2020

(54) HIGH INTEGRITY MULTICORE COMPUTING ENVIRONMENT WITH GRANULAR REDUNDANT MULTI-THREADING

(71) Applicant: Rockwell Collins, Inc., Cedar Rapids, IA (US)

(72) Inventors: Matthew P. Corbett, Mount Vernon, IA (US); Jason R. Owen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 166 days.

(21) Appl. No.: 16/059,823

(22) Filed: Aug. 9, 2018

(51) Int. Cl.
| | |
|---|---|
| *G06F 9/46* | (2006.01) |
| *G06F 9/48* | (2006.01) |
| *G06F 9/455* | (2018.01) |
| *G06F 9/50* | (2006.01) |

(52) U.S. Cl.
CPC ........ *G06F 9/4881* (2013.01); *G06F 9/45533* (2013.01); *G06F 9/5027* (2013.01)

(58) Field of Classification Search
None
See application file for complete search history.

*Primary Examiner* — Gregory A Kessler
(74) *Attorney, Agent, or Firm* — Suiter Swantz pc llo

(57) ABSTRACT

A system and method for granular redundant multithreading in a high integrity multicore processing environment (MCPE) generates redundant critical application threads incorporating executable instructions and input data relevant to a critical process when a user application running on a homogenous core of the MCPE encounters the critical process and issues a system call. The critical application threads are forked to different processing cores environments for execution, and the result sets of each executed critical application threads are forked to different cores for cross-comparison (different from the cores on which the result sets were generated). The result sets are cross-checked to the desired degree of integrity (e.g., consensus agreement or majority vote of all comparing cores) and the hypervisor returns the execution returned to the calling user application with the final result set (or with a fault, if the evaluation was unsuccessful and the desired level of agreement not reached).

13 Claims, 4 Drawing Sheets

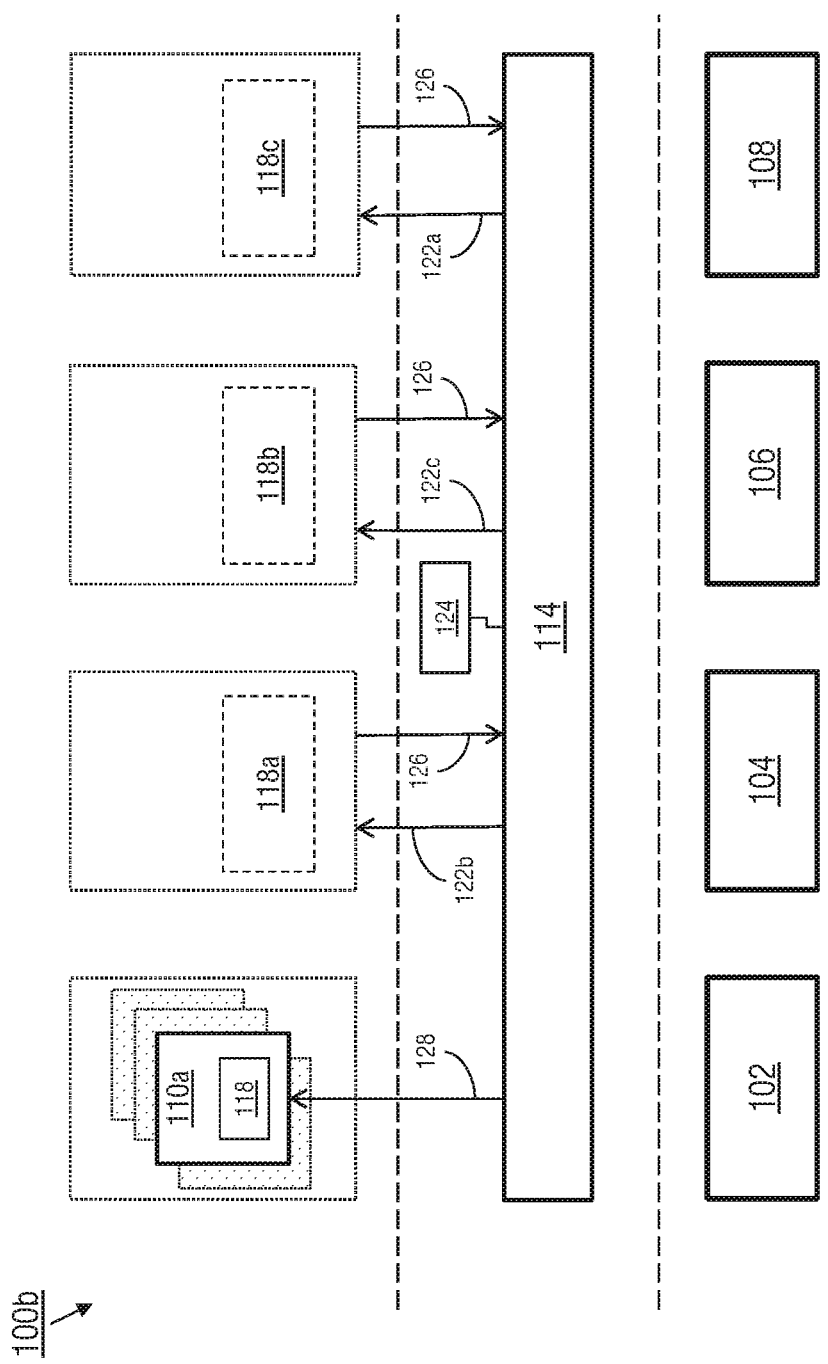

HIGH INTEGRITY MULTICORE COMPUTING ENVIRONMENT WITH GRANULAR REDUNDANT MULTI-THREADING

BACKGROUND

Flight-critical avionics systems require high integrity (e.g., $2e^{-10}$) computation, as a control system fault inflight may have catastrophic results. The classical approach to providing an application-transparent high integrity computing platform has been hardware lockstep. Such a cycle-for-cycle lockstep approach requires two physically independent processor instances (cores) operating in unison with an external function that provides control and monitoring for each processor's transactions with clock-cycle granularity. A processing error is indicated through a divergence in the compared transactions between the two processing cores, requiring that the inputs and outputs for each processing channel remain completely synchronized at the granular instruction level. Any asynchronous events must be synchronized to the processing cores, and some performance features of the cores may need to be disabled in order to maintain the cycle accuracy of the cores over long periods of execution.

Modern processor architectures have greatly changed since the early 2000s and the adoption of multicore computing architectures and System on Chip (SoC) based designs. Due to this high level of integration of multiple cores, hardware accelerators and peripherals, creating a high integrity architecture is nowhere near as straightforward. Higher levels of integration complicate the synchronization of asynchronous hardware events within the multicore SoC devices. The interconnect architectures used to connect all of the multiple cores, peripherals, accelerators and memory controllers result in numerous internal clock domain crossings and interference latencies through arbitration of shared resources which result in system jitter. These challenges are further compounded in modern processor architectures which leverage branch prediction, Translation Lookaside Buffers, multi-level caches, out-of-order/speculative execution and unexpected machine state interrupts. Processing architectures will continue to advance by adopting more performance-driven architectures that are not designed with determinism in mind, making the task of granular lockstep at the hardware level increasingly difficult. Accordingly, modern processing architectures may not support instruction level lockstep unless designed in by the silicon manufacturer, and general purpose processor elements with COTS devices do not support high integrity operation without some form of custom hardware or software. In order to continue to leverage commercial off-the-shelf (COTS) devices for high integrity general purpose processing, system designers will need to adopt new processing architectures and approaches that leverage the capabilities of current multicore SoC devices in order to achieve a comparable level of synchronization.

SUMMARY

In one aspect, embodiments of the inventive concepts disclosed herein are directed to a high integrity (e.g., $2e^{-10}$) multicore processing environment (MCPE) incorporating granular redundant multithreading. The MCPE includes a group (at least two) of homogenous processing cores with multiple user applications concurrently running thereon. Should the user application encounter a critical processing task requiring higher computational integrity, the application may issue a schedule request, or system call, to the MCPE scheduler or hypervisor. Upon receiving the schedule request, the hypervisor generates multiple critical application threads by replicating the encoded instructions and input data relevant to the critical task; depending on the desired degree of integrity two, three, or more critical application threads may be created. The hypervisor dispatches the critical application threads for execution by alternative cores of the MCPE, e.g., processing cores of the MCPE other than the processing core from which the schedule request originated. The hypervisor then traps on the schedule request while the redundant application threads complete. Upon completion, the hypervisor dispatches the result sets to affined processing cores for cross-comparison (e.g., each result set is evaluated by a core other than the core on which it was generated, to ensure the operational correctness of each core). When the cross-checking of all result sets is complete (e.g., by consensus agreement or majority vote, depending upon the desired degree of integrity) the hypervisor returns the execution back to the calling user application, with the verified result set (if the cross-check was successful) or with a fault warning (if the cross-check was unsuccessful).

In a further aspect, embodiments of the inventive concepts disclosed herein are directed to a method for granular redundant multithreading in a multicore processing environment (MCPE) of homogenous processing cores. A hypervisor or scheduler of the MCPE receives a schedule request from a user application running on the homogenous cores, the schedule request associated with a critical task or process encountered by the user application. The scheduler generates a group of redundant critical application threads (e.g., two, three or more, depending upon the desired degree of integrity), each critical application thread incorporating executable coded instructions and input data relevant to the critical task. The hypervisor dispatches, or forks, each critical application thread to an affined processing core of the MCPE, e.g., a core other than the core from which the schedule request originated. The affined cores generate result sets based on the dispatched critical application threads. When all critical application threads have completed and returned a result set, the hypervisor dispatches the result sets to affined processing cores for cross-comparison, e.g., each result set is dispatched to a core other than the core on which it was generated to check the operational correctness of the cores. When all cross-comparisons are complete, the hypervisor returns the execution and the results (e.g., a result set selected by consensus agreement, a majority-vote result set, or a fault associated with an unsuccessful evaluation via which the desired confidence level could not be reached) to the calling user application.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 2A and 2B illustrate operations of the MCPE of FIG. 1.

DETAILED DESCRIPTION OF EXEMPLARY EMBODIMENTS

Figure 1:
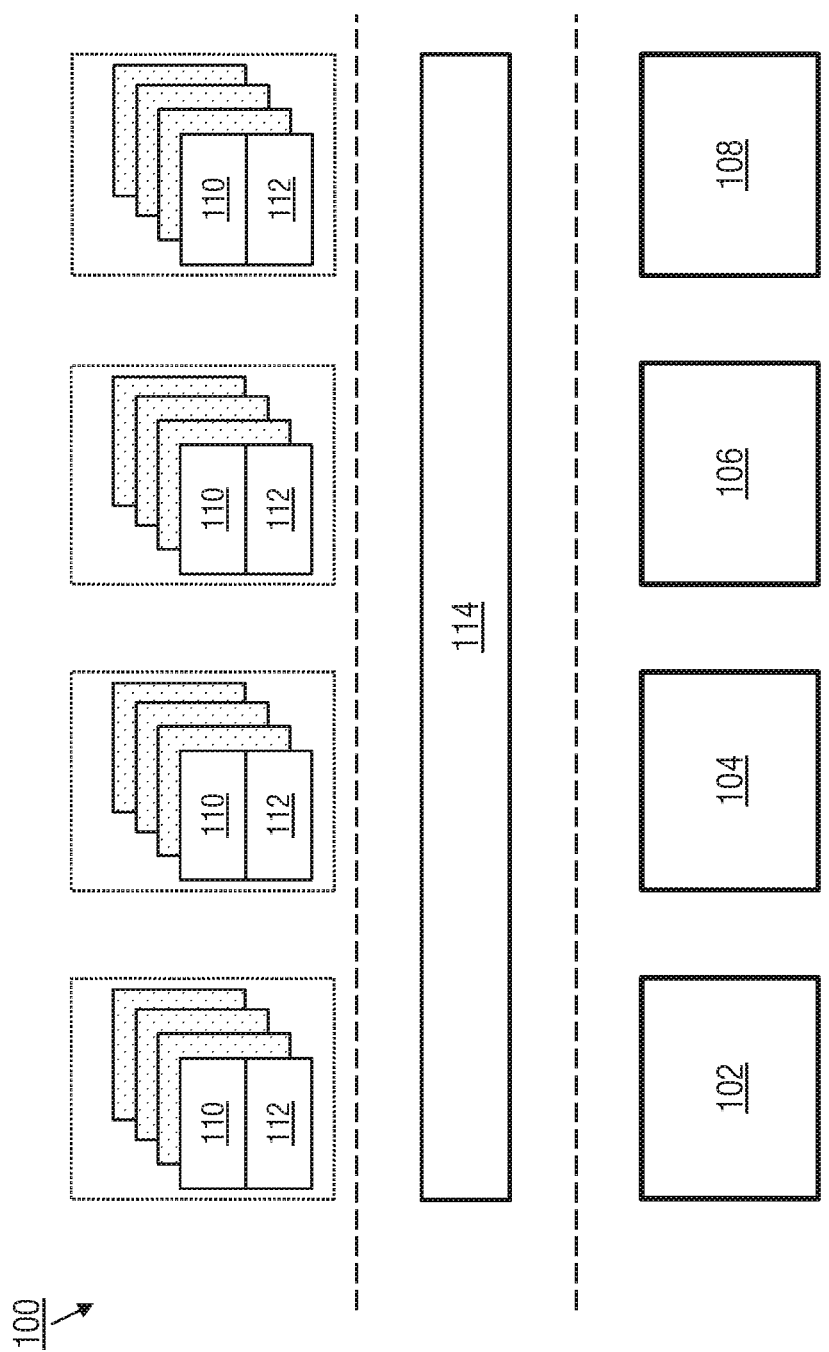
FIG. 1 illustrates an exemplary embodiment of a multicore processing environment (MCPE) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for granular redundant multithreading across homogenous processing cores of a multicore environment without native lockstep capability. Rather than checking for matching granular bus transactions at the instruction level, the scheduler may spawn multiple software versions for execution, synchronizing and cross-checking the software products.

Referring to FIG. 1, an exemplary embodiment of a multicore processing environment (MCPE) 100 according to the inventive concepts disclosed herein may include two or more homogenous processing cores 102, 104, 106, 108 (HPC). Each HPC 102-108 or processing element may have several user applications 110 configured to execute thereon (e.g., redundant instances of a user application 110 may execute on multiple cores), as well as a real-time operating system 112 (RTOS). Scheduling and redundant operations on each HPC 102-108 may be managed by a hypervisor 114 (e.g., scheduler).

Figure 2A:
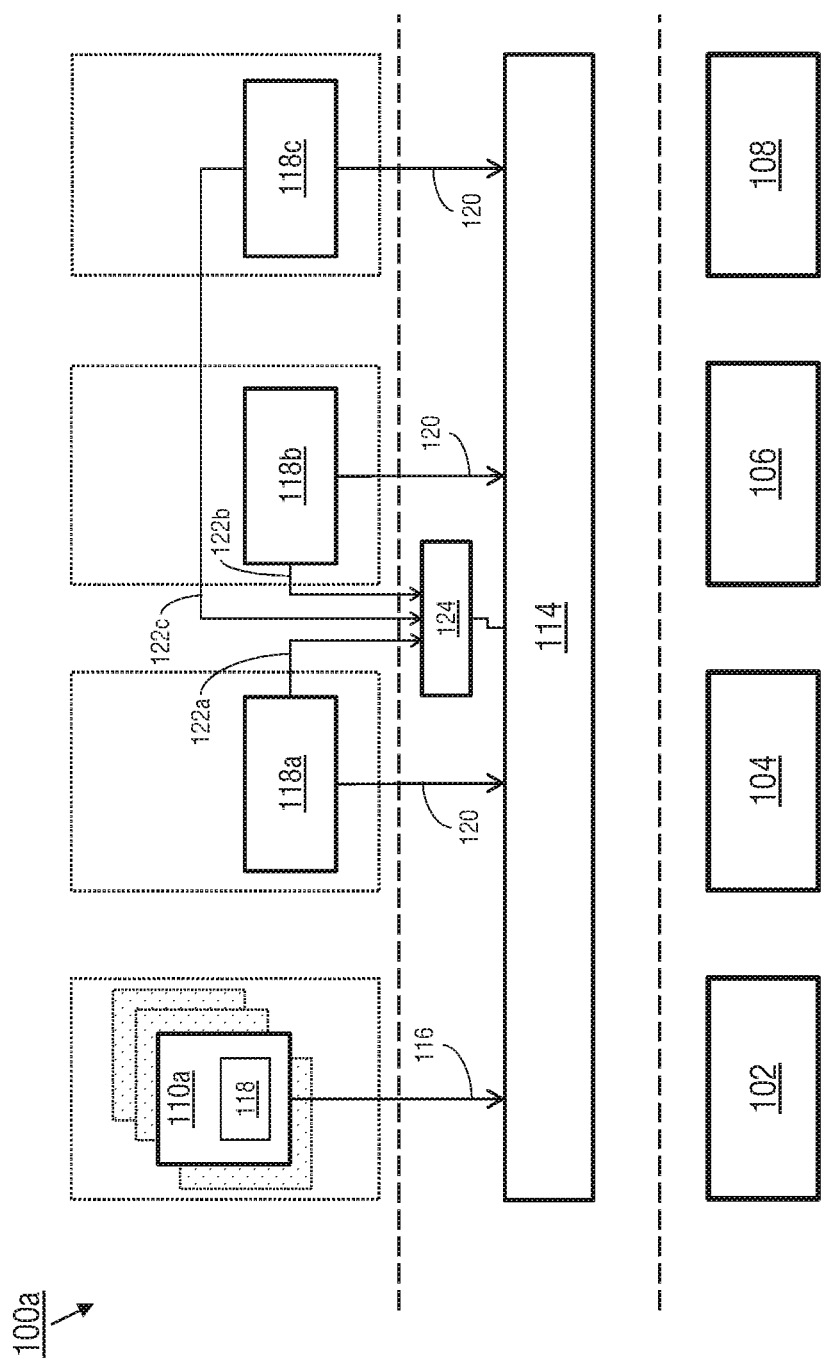

Referring to FIG. 2A, the MCPE 100a may be implemented and may function similarly to the MCPE 100 of FIG. 1, except that the MCPE 100a may schedule granular tasks within a scheduled user application 110a, forking (dispatching) the granular tasks to affine processing elements within the MCPE. For example, the user application 110a may be implemented and may function similarly to the user applications 110 of FIG. 1, except that the user application 110a, executing on the HPC 102, may encounter a critical function (e.g., task, process), generating a fork request (116) to the scheduler 114. The scheduler 114 may fork the critical function onto the affine HPCs 104, 106, 108 (e.g., other than the originating HPC 102) by identifying within the executable code of the user application 110a a kernel (118; e.g., unary data set) including input data as well as executable code for the critical task or process. The input data may include system time inputs so that the outputs of the forked critical function converge. The scheduler 114 may create independent copies (118a-c) of the kernel 118, dispatching each independent copy 118a-c to a respective HPC 104, 106, 108 within the MCPE for execution. Depending upon the desired system integrity, the scheduler 114 may create two, three, four, or more independent copies 118a-c of the kernel 118. Each independent copy 118a-c executes on its respective HPC 104, 106, 108, returning with a join request (120) and storing its result set (122a-c) to memory (124) while the scheduler 114 waits for all redundant execution threads (independent copies 118a-c) to complete.

Referring to FIG. 2B, the MCPE 100b may be implemented and may function similarly to the MCPE 100a of FIG. 2A, except that the redundant critical application threads of the MCPE 100b, e.g., the independent copies 118a-c dispatched to respective affine HPCs 104, 106, and 108, have completed and returned, their result sets 122a-c stored to memory 124. The scheduler 114 may compare the stored result sets 122a-c from each independent copy 118a-c by forking each result set to a different affine HPC 102-108 (e.g., different from the HPC on which the result set was generated). For example, the result sets 122a, 122b, 122c, originating respectively from independent copies 118-c on HPCs 104, 106, 108 may respectively be dispatched to the HPCs 108, 104, 106 for cross-comparison. In some embodiments, a cross-comparison may be performed by the original HPC 102 upon which the user application 110a is executing (e.g., provided the result set to be compared was not generated thereby). Cross-comparisons of result sets 122a-c are performed by different HPCs 102-108 from the HPCs on which the result sets were generated to ensure the operational integrity of the HPCs. For example, if the HPC 108 was at fault, calling the integrity or correctness of the result set 122c generated thereby into question, an evaluation by the same faulty HPC 108 may not reveal faults in the result set 122c, instead returning erroneous good values. When the cross-comparisons have completed (e.g., via join requests (126) from each comparing HPC 104-108), the scheduler 114 may select a final result set 128 of the critical function (e.g., the kernel 118) to be returned to the user application 110a. For example, if a high degree of system integrity is desired, the scheduler 114 may select a final result set 128 (indicating a successful execution of the critical function 118) if all three result sets 122a-c agree (e.g., any identical result set 122a, 122b, 122c may be selected as the final result set). Alternatively, the scheduler 114 may select the final result set 128 by majority vote, e.g., if two result sets 122a, 122c agree then either result set may be selected as the final result set 128 (and the HPC 106, on which the outlying result set 122b was generated (see FIG. 2A), may be further checked for system faults). If the verification requirements of the critical function are not met (for example, if the scheduler 114 requires consensus agreement of all result sets 122a-c and consensus is not achieved), the scheduler may indicate a fault in one or more HPCs 104-108 without propagating a result set to the user application 110a.

Figure 3:
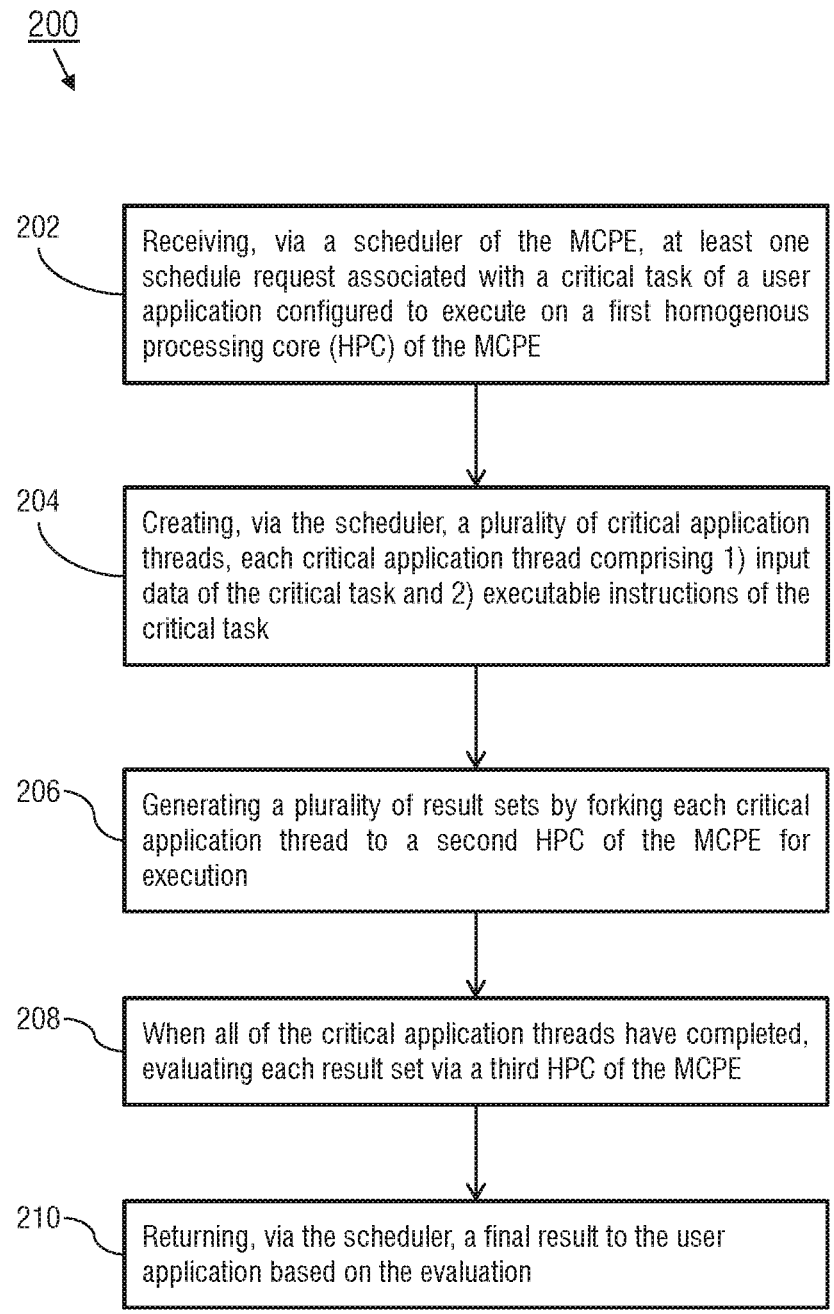
FIG. 3 illustrates an exemplary embodiment of a method for granular redundant multithreading according to the inventive concepts disclosed herein.

Referring now to FIG. 3, an exemplary embodiment of a method 200 for granular redundant multithreading according to the inventive concepts disclosed herein may be implemented by the MCPE 100, 100a-b in some embodiments, and may include one or more of the following steps.

At a step 202, a scheduler or hypervisor of the MCPE receives a schedule request associated with a critical function or task encountered by a user application configured to execute on a first homogenous processing core (HPC) of the MCPE.

At a step 204, the scheduler creates a plurality of kernels or critical application threads, each kernel an independent copy including at least input data of the critical function and executable instructions of the critical function. For example, the input data may include system time inputs.

At a step 206, the scheduler generates result sets by forking each independent copy to an affine HPC of the MCPE (e.g., an HPC other than the HPC on which the original user application is executing) for execution.

At a step 208, when all of the independent copies have finished executing and returned result sets, the scheduler may cross-compare each result set by forking the result set out to a different affine HPC (e.g., an HPC other than the HPC on which the result set was generated) for evaluation. For example, a result set may be cross-compared by the HPC on which the original user application is executing, provided the result set was not generated on that HPC.

At a step 210, the scheduler returns a final result to the user application based on a successful evaluation (e.g., consensus or majority agreement of the generated result sets). If the required level of agreement is not achieved, the scheduler may return a fault in one or more HPCs without propagating result set data to the user application.

As will be appreciated from the above, systems and methods according to embodiments of the inventive concepts disclosed herein may provide a high integrity computational platform capable of managing flight-critical systems and tasks in a multicore processing environment, providing resilience against soft errors via redundant processing across multiple homogenous cores with no knowledge requirements for user application developers.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A multicore processing environment, comprising:
a plurality of homogenous processing cores (HPC);
at least one user application configured to execute on the plurality of HPC, the user application configured to issue at least one schedule request corresponding to a critical task of the user application and to a first HPC of the plurality of HPC;
and
at least one scheduler coupled to the plurality of HPC, the scheduler configured to:
receive the at least one schedule request;
in response to the schedule request, create a plurality of critical application threads associated with the user application, each critical application thread comprising 1) input data associated with the critical task and 2) executable instructions associated with the critical task;
generate a plurality of result sets by forking each critical application thread for execution by a second HPC of the plurality of HPCs;
evaluate each result set by forking the result set to a third HPC of the plurality of HPCs;
and
returning a final result to the first HPC based on the evaluation.

2. The multicore processing environment of claim 1, wherein the at least one third HPC includes the first HPC.

3. The multicore processing environment of claim 1, wherein the evaluation is a successful evaluation and the final result includes a passing result set of the plurality of result sets.

4. The multicore processing environment of claim 3, wherein the passing result set is based on unanimous agreement of the plurality of result sets.

5. The multicore processing environment of claim 3, wherein the passing result set is based on majority agreement of the plurality of result sets.

6. The multicore processing environment of claim 1, wherein the evaluation is an unsuccessful evaluation and the final result excludes the result set.

7. The multicore processing environment of claim 1, wherein the input data includes at least one system time input.

8. A method for granular redundant multithreading in a multicore processing environment (MCPE), the method comprising:

receiving, via a scheduler of the MCPE, at least one schedule request associated with a critical task of a user application configured to execute on a first homogenous processing core (HPC) of the MCPE;

creating, via the scheduler, a plurality of critical application threads, each critical application thread comprising 1) input data of the critical task and 2) executable instructions of the critical task;

generating a plurality of result sets by forking each critical application thread to a second HPC of the MCPE for execution;

when all of the critical application threads have completed, evaluating each result set via a third HPC of the MCPE; and returning, via the scheduler, a final result to the user application based on the evaluation.

9. The method of claim 8, wherein when all of the critical application threads have completed, evaluating each result set via a third HPC of the MCPE includes:

when all of the critical application threads have completed, evaluating at least one result set via the first HPC.

10. The method of claim 8, wherein returning, via the scheduler, a final result to the user application based on the evaluation includes:

returning a passing result set to the user application based on a unanimous agreement of the plurality of result sets.

11. The method of claim 8, wherein returning, via the scheduler, a final result to the user application based on the evaluation includes:

returning a passing result set to the user application based on a majority agreement of the plurality of result sets.

12. The method of claim 8, wherein returning, via the scheduler, a final result to the user application based on the evaluation includes:

returning a fault to the user application based on an unsuccessful evaluation of the plurality of result sets.

13. The method of claim 8, wherein creating, via the scheduler, a plurality of critical application threads, each critical application thread comprising 1) input data of the critical task and 2) executable instructions of the critical task includes:

creating, via the scheduler, a plurality of critical application threads, each critical application thread including a system time input.

* * * * *